United States Patent
Lan et al.

(10) Patent No.: US 11,204,593 B2
(45) Date of Patent: Dec. 21, 2021

(54) CONTROL DEVICE AND ADJUSTMENT METHOD

(71) Applicant: Nuvoton Technology Corporation, Hsinchu (TW)

(72) Inventors: Yung-Chi Lan, Taichung (TW); Chun-Chi Chen, Tainan (TW); Cheng-Chih Wang, Jhubei (TW); Chih-Ping Lu, Hsinchu (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 72 days.

(21) Appl. No.: 16/728,533

(22) Filed: Dec. 27, 2019

(65) Prior Publication Data

US 2021/0034025 A1 Feb. 4, 2021

(30) Foreign Application Priority Data

Aug. 2, 2019 (TW) .................................. 108127440

(51) Int. Cl.
*G05F 1/10* (2006.01)
*G05B 19/042* (2006.01)

(52) U.S. Cl.
CPC ............ *G05B 19/042* (2013.01); *G05F 1/10* (2013.01); *G05B 2219/2639* (2013.01)

(58) Field of Classification Search
None
See application file for complete search history.

(56) References Cited

U.S. PATENT DOCUMENTS

| 10,678,726 | B2 * | 6/2020 | Rennig | ................ G06F 13/362 |
| 2013/0179710 | A1 * | 7/2013 | Chang | ................... G06F 1/3287 |
| | | | | 713/322 |

(Continued)

FOREIGN PATENT DOCUMENTS

| CN | 103455077 A | 12/2013 |
| CN | 105261338 A | 1/2016 |

(Continued)

OTHER PUBLICATIONS

Search report issued in corresponding TW application No. 108127440 with a completion date of Oct. 29, 2020.

(Continued)

*Primary Examiner* — Jeffrey A Gblende
(74) *Attorney, Agent, or Firm* — Muncy, Geissler, Olds and Lowe, P.C.

(57) ABSTRACT

A control device for adjusting the output voltage of a voltage generator, wherein the control device includes a master circuit, a slave circuit, and a power-scaling control circuit, is provided. The master circuit is coupled to a system bus. The slave circuit is coupled to the system bus. The power-scaling control circuit is coupled between the master circuit and the slave circuit. In response to the master circuit sending a voltage-scaling command, the power-scaling control circuit sets a control signal at a suspension level so that the slave circuit sets a specific signal transmitted by the system bus at a wait level. In response to the specific signal being at the wait level, the master circuit stops accessing the first specific device of the slave circuit. In response to the control signal being at the suspension level, the power-scaling control circuit adjusts the output voltage.

14 Claims, 4 Drawing Sheets

(56) References Cited

U.S. PATENT DOCUMENTS

2014/0380403 A1\* 12/2014 Pearson ................ G06F 21/57
 726/1
2019/0039163 A1\* 2/2019 Kawai .................... H02M 7/12

FOREIGN PATENT DOCUMENTS

TW 201339820 A 10/2013
TW 201503616 A 1/2015

OTHER PUBLICATIONS

Office Action issued in corresponding TW application No. 108127440 dated Oct. 30, 2020.

\* cited by examiner

CONTROL DEVICE AND ADJUSTMENT METHOD

CROSS REFERENCE TO RELATED APPLICATIONS

This application claims priority of Taiwan Patent Application No. 108127440, filed on Aug. 2, 2019, the entirety of which is incorporated by reference herein.

BACKGROUND OF THE INVENTION

Field of the Invention

The invention relates to a control device, and more particularly to a control device that is capable of adjusting the output voltage of a voltage generator.

Description of the Related Art

With the development of technology, the functions and types of electronic devices have increased. Generally, each electronic device comprises at least one voltage generator to provide an operation voltage. When the operation voltage is changed, the electronic elements, which operate according to the operation voltage, may malfunction.

BRIEF SUMMARY OF THE INVENTION

In accordance with an embodiment, a control device adjusts an output voltage of a voltage generator and comprises a master circuit, a slave circuit and a power-scaling control circuit. The master circuit is coupled to a system bus. The slave circuit is coupled to the system bus. The power-scaling control circuit is coupled between the master circuit and the slave circuit. In response to the master circuit sending a voltage-scaling command, the power-scaling control circuit sets a control signal at a suspension level so that the slave circuit sets a specific signal transmitted by the system bus at a wait level. In response to the specific signal being at the wait level, the master circuit stops accessing the first specific device of the slave circuit. In response to the control signal being at the suspension level, the power-scaling control circuit adjusts the output voltage.

In accordance with a further embodiment, an adjustment method for adjusting the output voltage of a voltage generator comprises determining whether a master circuit sends a voltage-scaling command; in response to determining that the voltage-scaling command is to be sent, setting a control signal at a suspension level so that a slave circuit sets a specific signal transmitted by a system bus at a wait level, wherein the master circuit is coupled to the system bus; adjusting the output voltage in response to the control signal being at the suspension level and the specific signal being at the wait level; determining whether the output voltage is equal to a predetermined value; in response to determining that the output voltage is equal to the predetermined value, setting the control signal at a release level so that the slave circuit transmits data to the master circuit or receives data from the master circuit via the system bus.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1A:
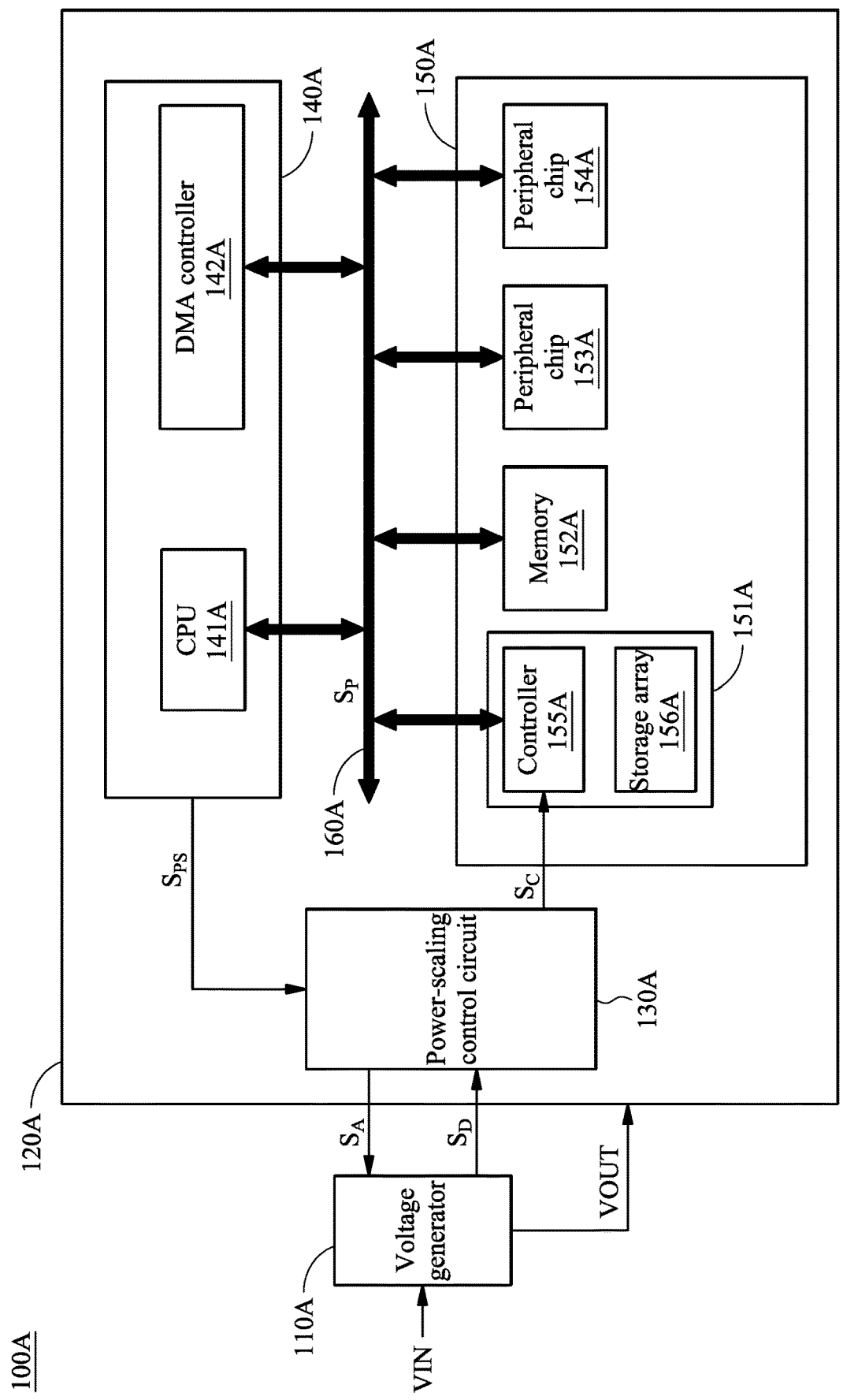
FIG. 1A is a schematic diagram of an exemplary embodiment of an operating system, according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1A is a schematic diagram of an exemplary embodiment of an operating system, according to various aspects of the present disclosure. The operating system 100A comprises a voltage generator 110A and a control device 120A. The voltage generator 110A transforms the level of an input voltage VIN to generate an output voltage VOUT. In one embodiment, the input voltage VIN is higher than the output voltage VOUT, but the disclosure is not limited thereto. In other embodiments, the input voltage VIN may be lower than the output voltage VOUT. The circuit structure of voltage generator 110A is not limited in the present disclosure. In one embodiment, the voltage generator 110A is a voltage regulator. In some embodiments, the output voltage VOUT is provided as the operation voltage of the control device 120A.

The control device 120A comprises a power-scaling control circuit 130A, a master circuit 140A and a slave circuit 150A. The master circuit 140A and the slave circuit 150A are coupled to a system bus 160A. In this embodiment, the master circuit 140A accesses the slave circuit 150A according to program code (not shown). In this case, the master circuit 140A learns whether the slave circuit 150A is ready according to a specific signal $S_P$ of the system bus 160A.

For example, when the specific signal $S_P$ is at a ready level (e.g., a high level), it means that the slave circuit 150A is ready. Therefore, the master circuit 140A accesses the slave circuit 150A via the system bus 160A. However, when the specific signal $S_P$ is at a wait level (e.g., a low level), it means that the slave circuit 150A is not ready. Therefore, the master circuit 140A enters a waiting state to wait that the specific signal $S_P$ is at the ready level. After the specific signal $S_P$ is at the ready level, the master circuit 140A accesses the slave circuit 150A via the system bus 160A.

When the master circuit 140A performs a power-scaling program code, the master circuit 140A sends a voltage-scaling command $S_{PS}$ to the power-scaling control circuit 130A. The circuit structure of master circuit 140A is not limited in the present disclosure. Any circuit can serve as the master circuit 140A, as long as the circuit is capable of sending access commands to the system bus 160A. In one embodiment, the master circuit 140A comprises a Central Processing Unit (CPU) 141 and/or a Direct Memory Access (DMA) controller 142A.

The slave circuit 150A operates according to the command of the system bus 160A. For example, when the master circuit 140A sends a read command to the system bus 160A, the slave circuit 150A generates output data according to the read command and provides the output data to the master circuit 140A via the system bus 160A. In this embodiment, when the lave circuit 150A has provided the output data to the system bus 160A, the slave circuit 150A sets the specific signal $S_P$ at a ready level to notice the master circuit 140A that the data is ready. Then, the master circuit 140A receives the output data provided by the slave circuit 150A via the system bus 160A. However, when he slave circuit 150A has not provided the output data to the system bus 160A, the slave circuit 150A sets the specific signal $S_P$ at a wait level so that the master circuit 140A enters a waiting state. In the waiting state, the master circuit 140A does not read data transmitted by the system bus 160A. Until the specific signal $S_P$ is at a ready level, the master circuit 140A starts receiving the output data provided from the slave circuit 150A via the system bus 160A.

The present disclosure does not limit the circuit structure of slave circuit 150A. In one embodiment, the slave circuit 150A comprises memories 151A and 152A and peripheral chips 153A and 154A. As shown in FIG. 1A, the memory 151A comprises a controller 155A and a storage array 156A. The controller 155A accesses the storage array 156A according to the command transmitted by the system bus 160A. In this embodiment, the memories 151A and 152A are volatile memories. For example, the memory 151A is a flash memory, and the memory 152A is a Static Random Access Memory (SRAM), but the disclosure is not limited thereto. In other embodiments, memories 151A and/or 152A may be non-volatile memory.

The invention is not limited to the kinds of peripheral chips 153A and 154A. In one embodiment, the peripheral chip 153A is an advanced high-performance bus (AHB) peripheral chip to be coupled to an external storage device. In another embodiment, the peripheral chip 154A is an advanced peripheral bus (APS) bridge to be coupled to a peripheral device (not shown) to optimize the power consumption of the peripheral device.

The power-scaling control circuit 130A is coupled between the master circuit 140A and the slave circuit 150A and operates in a normal mode or in a scaling mode. For example, when the master circuit 140A sends the voltage-scaling command $S_{PS}$, the power-scaling control circuit 130A enters a scaling mode. In the scaling mode, the power-scaling control circuit 130A sets a control signal $S_C$ at a suspension level (e.g., a high level) to direct the slave circuit 150A to set the specific signal $S_P$ of the system bus 160A at a wait level. Therefore, the master circuit 140A enters a waiting state to stop accessing at least one specific device of the slave circuit 150A. In other embodiments, the master circuit 140A may continuously access other specific devices of the slave circuit 150A or it may stop accessing all devices of the slave circuit 150A.

In this embodiment, since the power-scaling control circuit 130A provides the control signal $S_C$ to the memory 151A, when the control signal $S_C$ is at the suspension level, the memory 151A sets the specific signal $S_P$ at the wait level. At this time, even if the memory 151A has provided data to the system bus 160A, the master circuit 140A stops receiving the data provided by the memory 151A via the system bus 160A. In this case, the memory 151A does not also receive the data provided by the master circuit 140A via the system bus 160A. In other embodiments, when the control signal $S_C$ is at the suspension level, the master circuit 140A stops accessing memory 151A, but it accesses memory 152A, peripheral chip 153A, and/or peripheral chip 154A.

In the scaling mode, the power-scaling control circuit 130A adjusts the output voltage VOUT. The invention does not limit how the power-scaling control circuit 130A adjusts the output voltage VOUT. In one embodiment, the power-scaling control circuit 130A generates an adjustment signal $S_A$. The voltage generator 110A adjusts (increases or reduces) the output voltage VOUT according to the adjustment signal $S_A$. After finishing the adjustment, the voltage generator 110A generates a finish signal $S_D$. The power-scaling control circuit 130A enters a normal mode according to the finish signal $S_D$.

In the normal mode, the power-scaling control circuit 130A sets the control signal $S_C$ at a release level. At this time, the memory 151A sets the level of the specific signal $S_P$ according to the state of the memory 151A. For example, when the memory 151 has output data to the system bus 160A or is ready to receive the data from the master circuit 140A, the memory 151A sets the specific signal $S_P$ at a ready level. Therefore, the master circuit 140A receives the data from the memory 151A via the system bus 160A or provides data to the memory 151A via the system bus 160A. However, when the memory 151A has not output data to the system bus 160A or is not ready to receive data from the master circuit 140A, the memory 151A still sets the specific signal $S_P$ at the wait level. Therefore, the master circuit 140A continues to wait. The master circuit 140A stops receiving the data provided by the memory 151A via the system bus 160A and stops providing data to the memory 151A via the system bus 160A until the memory 151A sets the specific signal $S_P$ at the ready level.

Since the output voltage VOUT serves the operation voltages of the master circuit 140A and the slave circuit 150A, when the voltage generator 110A reduces the output voltage VOUT according to the adjustment signal $S_A$, the power consumed by the master circuit 140A and the slave circuit 150A are reduced. Additionally, since the memory 151A also operates according to the output voltage VOUT, when the voltage generator 110A adjusts the output voltage VOUT, the memory 151A may generate error data due to variations in the output voltage VOUT. Therefore, while the voltage generator 110A adjusts the output voltage, the memory 151A stops outputting data or receiving data to avoid outputting error data or receiving error data. Furthermore, while the voltage generator 110A adjusts the output voltage VOUT, the master circuit 140A stops accessing the memory 151A to avoid error data received by the master circuit 140A. However, since the other devices (e.g., 153A and 154A) of the slave circuit 150A are not affected by variations in the output voltage VOUT, while the voltage generator 110A adjusts the output voltage VOUT, the master circuit 140A can access the other devices of the slave circuit 150A normally.

In other embodiments, when the master circuit 140A sends the voltage-scaling command $S_{PS}$, the power-scaling control circuit 130A determines whether the master circuit 140A is performing an access operation on the slave circuit 150A. When the master circuit 140A is performing an access operation on the slave circuit 150A, the power-scaling control circuit 130A still operates in the normal mode and does not enter the scaling mode. At this time, the master circuit 140A can access any device of the slave circuit 150A via the system bus 160A. However, when the master circuit 140A completes the access operation, the power-scaling control circuit 130A enters the scaling mode and sets the control signal $S_C$ at the suspension level. Therefore, the master circuit 140A does not access a specific device (e.g., 151A) of the slave circuit 150A. At this time, the specific device of the slave circuit 150A stops operating.

Figure 1B:
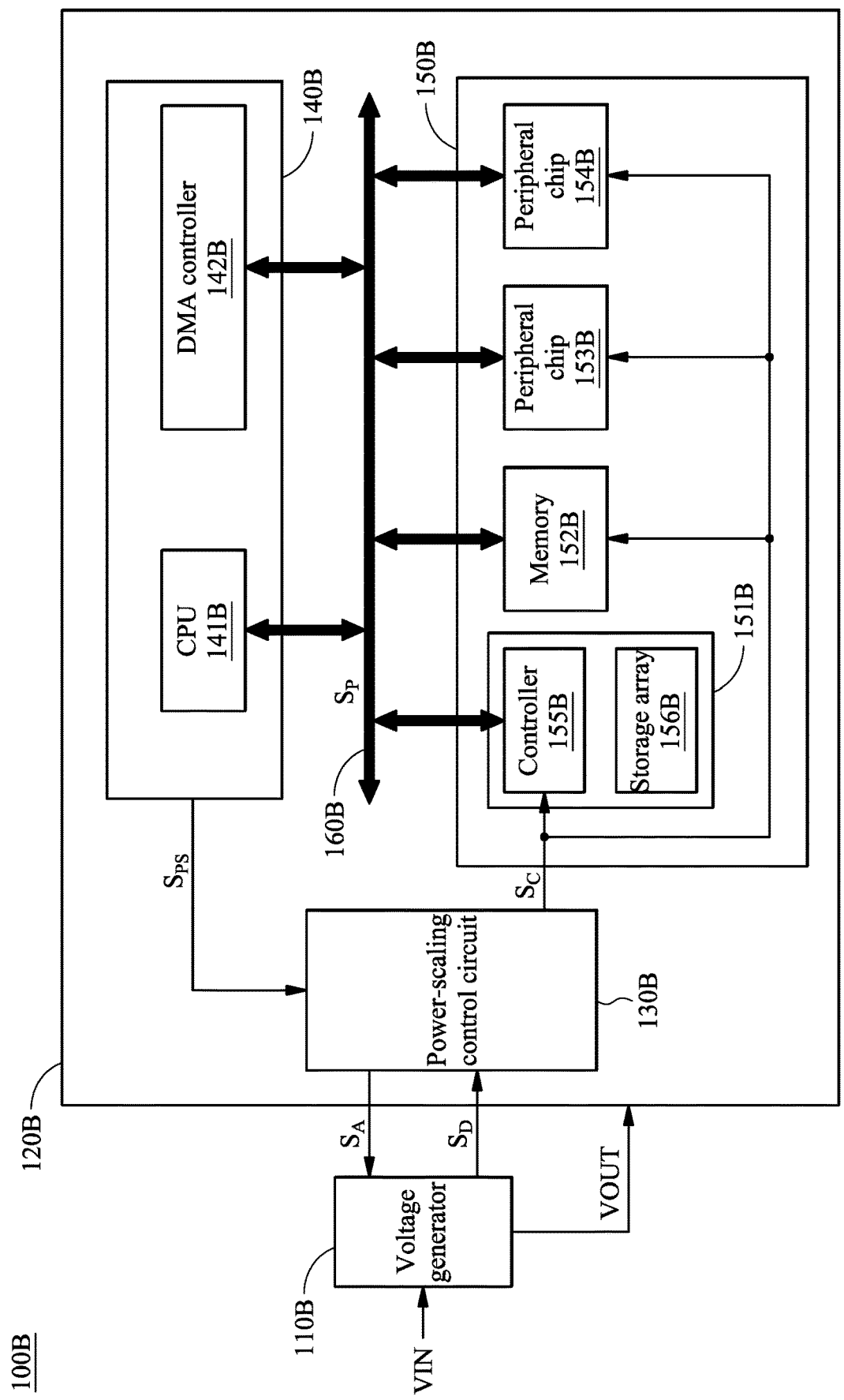
FIG. 1B is a schematic diagram of another exemplary embodiment of the operating system, according to various aspects of the present disclosure.

FIG. 1B is a schematic diagram of another exemplary embodiment of the operating system, according to various aspects of the present disclosure. FIG. 1B is similar to FIG. 1A with the exception that the power-scaling control circuit 130B shown in FIG. 3B provides the control signal $S_C$ to the memories 151B and 152B, and the peripheral chips 153B and 154B. In this case, when the control signal $S_C$ is at the suspension level, the memories 151B and 152B, and the peripheral chips 153B and 154B stop outputting data to the master circuit 140B via the system bus 160B and stop receiving data provided by the master circuit 140B via the system bus 160B.

Taking the memory 152B as an example, when the master circuit 140B is ready to access the memory 152B, since the control signal $S_C$ is at a suspension level, the memory 152B stops performing the command sent by the master circuit 140B and sets the specific signal $S_P$ at a wait level. Therefore, the master circuit 140B learns that the memory 152 is not ready and stops accessing the memory 152B. When the control signal $S_C$ is at a release level, the memory 152B performs the command sent by the master circuit 140B and sets the level of the specific signal $S_P$ according to the state of the memory 152B.

For example, assume that the master circuit 140B sends a read command to the memory 152B via the system bus 160B. In such cases, when the memory 152B has provided data to the system bus 160B, the memory 152B sets the specific signal $S_P$ at a ready level. Therefore, the master circuit 140B reads the data of the system bus 160B. However, when the memory 152B has not provided data to the system bus 160A, the memory 152B sets the specific signal $S_P$ at a wait level. Therefore, the master circuit 140B does not read the data transmitted by the system bus 160A.

Figure 2A:
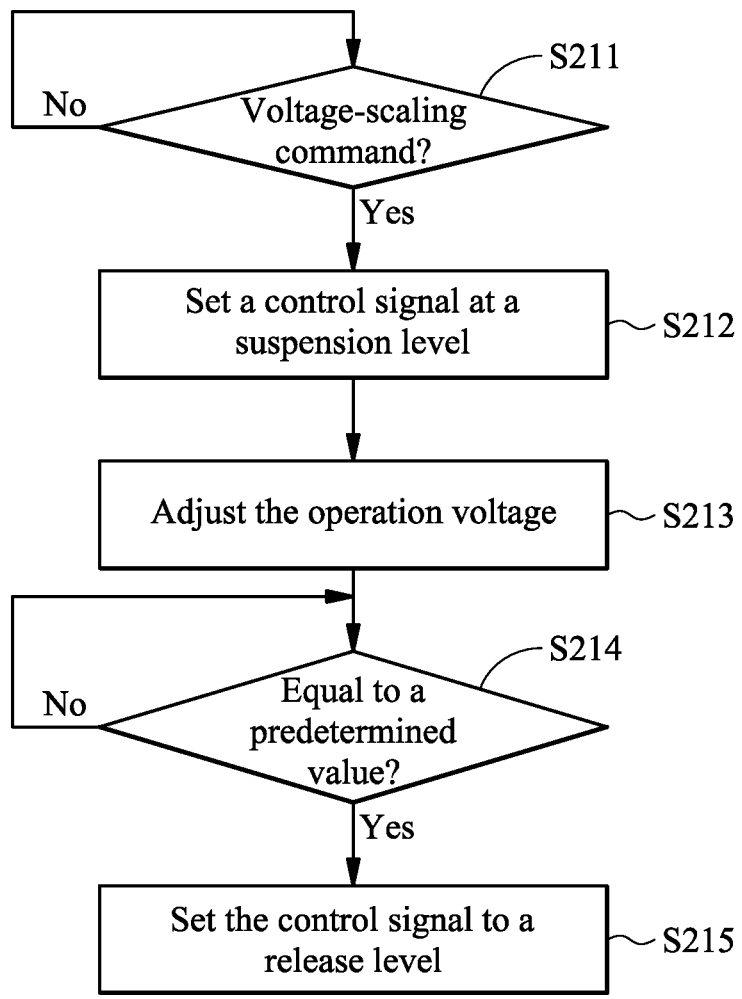
FIG. 2A is a flowchart diagram of an exemplary embodiment of an adjustment method, according to various aspects of the present disclosure.

FIG. 2A is a flowchart diagram of an exemplary embodiment of an adjustment method, according to various aspects of the present disclosure. The adjustment method is utilized to adjust an operation voltage received by a master circuit and a slave circuit. In one embodiment, the operation voltage is an output voltage of a voltage regulator. When the master circuit receives the output voltage of the voltage regulator, the master circuit accesses the slave circuit via a system bus. In this case, the slave circuit may output data to the master circuit via the system bus or receive data from the master circuit via the system bus. The invention is not limited to the circuit structures of master circuit and slave circuit. In one embodiment, the master circuit at least comprises a CPU and a DMA controller, and the slave circuit at least comprises a memory and a peripheral chip.

First, a determination is made as to whether the master circuit sends a voltage-scaling command (step S211). In one embodiment, when the master circuit executes a specific program code, the master circuit sends the voltage-scaling command. In this case, the specific program code is to adjust the output voltage.

When the master circuit does not send the voltage-scaling command, step S211 is performed. When the master circuit sends the voltage-scaling command, a control signal is set at a suspension level (step S212). In one embodiment, a power-scaling control circuit is utilized to set the control signal at the suspension level so that the master circuit enters a waiting state according to the control signal. For example, the slave circuit may set a specific signal transmitted by the system bus at a wait level. Therefore, the master circuit enters the waiting state to stop accessing at least one specific device of the slave circuit. In one embodiment, the master circuit still accesses other devices of the slave circuit or it stops accessing all devices of the slave circuit.

Taking FIG. 1A as an example, the memory 151A of the slave circuit 150A sets the level of the specific signal $S_P$ according to the control signal $S_C$. For example, when the control signal $S_C$ is at the suspension level, the memory 151A sets the specific signal $S_P$ at a wait level (e.g., a low level). The memory 151A stops outputting data to the system bus 160A and stops receiving data from the system bus 160A. In this case, the master circuit 140A does not access the memory 151A, but it does access the memory 152A, the peripheral chip 153A and/or the peripheral chip 154A via the system bus 160A. In other embodiments, when the control signal $S_C$ is at the suspension level, the master circuit 140A does not access all devices (e.g., 151B, 152B, 153B and 154B) in the slave circuit 150A.

Then, the output voltage is adjusted when the control signal is at the suspension level and the specific signal is at the wait level (step S213). In one embodiment, the power-scaling control circuit generates an adjustment signal to the voltage generator. The voltage generator adjusts (e.g., increases or reduces) the output voltage according to the adjustment signal. For example, the voltage generator may adjust the output voltage from 3.3V to 1.5V.

Next, a determination is made as to whether the output voltage is equal to a predetermined value (step S214). In one embodiment, when the voltage generator finishes the adjustment of the output voltage, the voltage generator sends a finish signal. Therefore, the power-scaling control circuit learns that the output voltage has been adjusted (i.e., equal to the predetermined value). In other embodiments, the power-scaling control circuit compares the output voltage to the predetermined value.

When the output voltage is not equal to the predetermined value, step S214 is performed. When the output voltage is equal to the predetermined value, the control signal is set to a release level (step S215). At this time, the power consumed by the master circuit and the slave circuit are reduced because the master circuit and the slave circuit operate according to the adjusted output voltage (e.g., 1.5V). Additionally, while the voltage generator adjusts the output voltage, at least one specific device (e.g., the memory 151A of FIG. 1A) of the slave circuit stops operating to avoid the specific device generating error data due to variations in the output voltage.

Figure 2B:
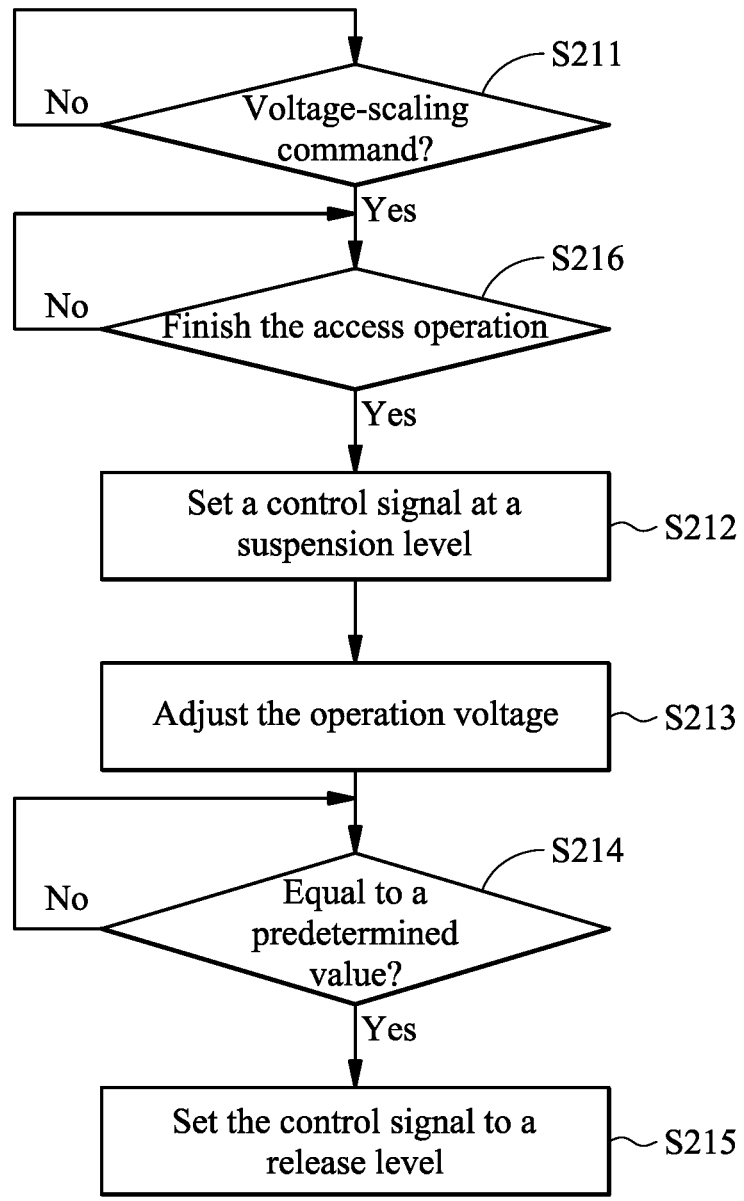
FIG. 2B is a flowchart diagram of another exemplary embodiment of the adjustment method, according to various aspects of the present disclosure.

FIG. 2B is a flowchart diagram of another exemplary embodiment of the adjustment method, according to various aspects of the present disclosure. FIG. 2B is similar to FIG. 2A except for the addition of step S216. When the master circuit sends a voltage-scaling command, a determination is made as to whether the master circuit is performing an access operation on the slave circuit (step S216). When the master circuit is performing an access operation on the slave circuit, step S216 is performed again and the control signal is not set to the suspension level. When the master circuit finishes the access operation, the control signal is set to the suspension level (step S214).

Adjustment methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes a control device for practicing the adjustment methods. The adjustment methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes a control device for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A control device for adjusting an output voltage of a voltage generator, comprising:
   a master circuit coupled to a system bus;
   a slave circuit coupled to the system bus; and
   a power-scaling control circuit coupled between the master circuit and the slave circuit, wherein in response to the master circuit sending a voltage-scaling command, the power-scaling control circuit sets a control signal at a suspension level so that the slave circuit sets a specific signal transmitted by the system bus at a wait level, wherein:
   in response to the specific signal being at the wait level, the master circuit stops accessing a first specific device of the slave circuit, and
   in response to the control signal being at the suspension level, the power-scaling control circuit adjusts the output voltage.

2. The control device as claimed in claim 1, wherein in response to the voltage generator generating a finish signal, the power-scaling control circuit sets the control signal at a release level so that the master circuit accesses the slave circuit via the system bus.

3. The control device as claimed in claim 1, wherein the first specific device is a flash memory comprising a controller and a storage array, and in response to the control signal being at the suspension level, the controller sets the specific signal at the wait level.

4. The control device as claimed in claim 3, wherein in response to the control signal being at the suspension level, the master circuit accesses a second specific device of the slave circuit.

5. The control device as claimed in claim 4, wherein the second specific device is a Static Random Access Memory (SRAM) and in response to the control signal being at the suspension level, the master circuit accesses the SRAM.

6. The control device as claimed in claim 5, wherein the second specific device further comprises at least one peripheral chip, and in response to the control signal being at the suspension level, the master circuit accesses the peripheral chip.

7. The control device as claimed in claim 1, wherein the master circuit comprises at least one of a Central Processing Unit (CPU) and a Direct Memory Access (DMA) controller.

8. The control device as claimed in claim 1, wherein the voltage generator is a voltage regulator, and the voltage regulator generates the output voltage according to an input voltage, which is larger than the output voltage.

9. The control device as claimed in claim 1, wherein the first specific device operates according to the output voltage.

10. The control device as claimed in claim 1, wherein:
    in response to the master circuit sending the voltage-scaling command, the power-scaling control circuit determines whether the master circuit is performing an access operation on the slave circuit,
    in response to the master circuit performing the access operation on the slave circuit, the power-scaling control circuit does not set the control signal at the suspension level, and
    in response to the master circuit completing the access operation, the power-scaling control circuit sets the control signal at the suspension level.

11. An adjustment method for adjusting an output voltage of a voltage generator, comprising:
    determining whether a master circuit sends a voltage-scaling command;
    in response to determining that the master circuit sends the voltage-scaling command, setting a control signal at a suspension level so that a slave circuit sets a specific signal transmitted by a system bus at a wait level, wherein the master circuit is coupled to the system bus;
    adjusting the output voltage in response to the control signal being at the suspension level and the specific signal being at the wait level;
    determining whether the output voltage is equal to a predetermined value; and
    in response to determining that the output voltage is equal to the predetermined value, setting the control signal at a release level so that the slave circuit transmits data to the master circuit or receives data from the master circuit via the system bus.

12. The adjustment method as claimed in claim 11, wherein the step of determining whether the output voltage is equal to the predetermined value is to determine whether the voltage generator generates a finish signal, and in response to the voltage generator generating the finish signal the control signal is set at the release level.

13. The adjustment method as claimed in claim 11, further comprising:
    providing the control signal to a flash memory,
    wherein in response to the control signal being at the suspension level, the flash memory sets the specific signal at the wait level.

14. The adjustment method as claimed in claim 11, wherein:
    in response to the master circuit sending the voltage-scaling command, the master circuit determines whether to perform an access operation on the slave circuit, in response to the master circuit performing the access operation on the slave circuit, the control signal is not set at the suspension level, and in response to the master circuit completing the access operation, the control signal is set at the suspension level.

\* \* \* \* \*